US012777245B2

(12) United States Patent
Tanaka et al.

(10) Patent No.: US 12,777,245 B2
(45) Date of Patent: Oct. 27, 2026

(54) IMAGING LINKING SYSTEM, SERVER DEVICE, IMAGING DEVICE, IMAGING LINKING METHOD, AND PROGRAM

(71) Applicant: FUJIFILM Corporation, Tokyo (JP)

(72) Inventors: Koichi Tanaka, Saitama (JP); Isao Koizumi, Saitama (JP); Hironori Yano, Saitama (JP); Mototada Otsuru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 13 days.

(21) Appl. No.: 18/898,658

(22) Filed: Sep. 26, 2024

(65) Prior Publication Data

US 2025/0024142 A1 Jan. 16, 2025

Related U.S. Application Data

(63) Continuation of application No. PCT/JP2023/011776, filed on Mar. 24, 2023.

(30) Foreign Application Priority Data

Mar. 31, 2022 (JP) ................................ 2022-059378

(51) Int. Cl.
*H04N 23/661* (2023.01)
*H04N 23/60* (2023.01)
(Continued)

(52) U.S. Cl.
CPC ......... *H04N 23/661* (2023.01); *H04N 23/611* (2023.01)

(58) Field of Classification Search
CPC .... H04N 23/661; H04N 23/611; H04N 23/64; H04N 23/667; H04N 23/60; G03B 15/00
See application file for complete search history.

(56) References Cited

U.S. PATENT DOCUMENTS 10,554,872 B2 * 2/2020 Fan ...................... H04N 23/661
2008/0129825 A1 * 6/2008 DeAngelis ........... H04N 23/661
348/E7.086

(Continued)

FOREIGN PATENT DOCUMENTS

JP 2010057057 3/2010
JP 2011066768 3/2011

(Continued)

OTHER PUBLICATIONS

"International Search Report (Form PCT/ISA/210) of PCT/JP2023/011776", mailed on May 16, 2023, with English translation thereof, pp. 1-7.

(Continued)

*Primary Examiner* — Ahmed A Berhan
(74) *Attorney, Agent, or Firm* — JCIPRNET

(57) ABSTRACT

Provided are an imaging linking system, a server device, an imaging device, an imaging linking method, and a program that specify an imaging possible device and transmit an imaging instruction. An imaging linking system (1) is the imaging linking system (1) in which an imaging device (100A to 100E) images a target subject (X) that sends position information, in which a first processor is configured to specify an imaging possible device capable of performing imaging and transmit an imaging instruction (I) for the target subject to the imaging possible device based on the position information of the target subject, and a second processor is configured to receive the imaging instruction (I).

19 Claims, 13 Drawing Sheets

(51) Int. Cl.
*H04N 23/611* (2023.01)
*H04N 23/667* (2023.01)

(56) References Cited

U.S. PATENT DOCUMENTS

| | | | | |
|---|---|---|---|---|
| 2010/0053371 | A1 | 3/2010 | Karimoto | |
| 2013/0169839 | A1 | 7/2013 | Takahashi | |
| 2020/0021745 | A1 * | 1/2020 | Ogura .................... | H04N 23/60 |

FOREIGN PATENT DOCUMENTS

| | | |
|---|---|---|
| JP | 2012050011 | 3/2012 |
| JP | 2013138314 | 7/2013 |
| JP | 2016171382 | 9/2016 |
| JP | 2017022650 | 1/2017 |

OTHER PUBLICATIONS

"Written Opinion of the International Searching Authority (Form PCT/ISA/237) of PCT/JP2023/011776", mailed on May 16, 2023, with English translation thereof, pp. 1-10.

* cited by examiner

| TARGET SUBJECT INFORMATION | | IMAGING PERSON INFORMATION | | | CAPTURED IMAGE |
|---|---|---|---|---|---|
| SUBJECT X<br>FA<br> | TRACKER P | IMAGING PERSON A | IMAGING DEVICE 100A | TERMINAL 101A | |
| | | IMAGING PERSON B | IMAGING DEVICE 100B | | |
| | | IMAGING PERSON C | IMAGING DEVICE 100C | | |
| | | IMAGING PERSON D | IMAGING DEVICE 100D | TERMINAL 101D | M M M M ..... |
| | | IMAGING PERSON E | IMAGING DEVICE 100E | | |

IMAGING LINKING SYSTEM, SERVER DEVICE, IMAGING DEVICE, IMAGING LINKING METHOD, AND PROGRAM

CROSS-REFERENCE TO RELATED APPLICATIONS

The present application is a Continuation of PCT International Application No. PCT/JP2023/011776 filed on Mar. 24, 2023 claiming priority under 35 U.S.C § 119(a) to Japanese Patent Application No. 2022-059378 filed on Mar. 31, 2022. Each of the above applications is hereby expressly incorporated by reference, in its entirety, into the present application.

BACKGROUND OF THE INVENTION

1. Field of the Invention

The present invention relates to an imaging linking system, a server device, an imaging device, an imaging linking method, and a program.

2. Description of the Related Art

In general, in an event such as a sports day, a guardian (parent) may reserve a place from an early time to secure a good imaging place or prepare imaging equipment at an expense, in order to acquire a good captured image of a child as much as possible.

However, even though the imaging place is secured with great care, a subject often moves, and thus the imaging place may not always be good. Further, there may be a case where the imaging equipment is not handled well.

On the other hand, in JP2011-66768A, a method has been proposed in which imaging support information is transmitted to a user camera using a network, in an event such as a sports day, to support imaging of a specific subject, such as a child.

SUMMARY OF THE INVENTION

One embodiment according to the technique of the present disclosure is to provide an imaging linking system, a server device, an imaging device, an imaging linking method, and a program that specify an imaging possible device and transmit an imaging instruction.

According to one aspect of the present invention, there is provided an imaging linking system in which an imaging device images a target subject that sends position information, the imaging linking system comprising a first processor configured to specify an imaging possible device capable of performing imaging, and transmit an imaging instruction for the target subject to the imaging possible device based on the position information of the target subject, and a second processor configured to receive the imaging instruction.

It is preferable that the imaging linking system further comprises a server device including the first processor.

It is preferable that the first processor is configured to receive an imaging request for the target subject, acquire the position information of the target subject based on a sending signal, acquire position information of the imaging device, specify the imaging possible device based on the position information of the target subject and the position information of the imaging device, and transmit the imaging instruction to the imaging possible device.

It is preferable that the first processor is configured to specify the imaging device as the imaging possible device based on a distance between the position information of the target subject and position information of the imaging device.

It is preferable that the imaging instruction is provided to all or a selection of a plurality of the second processors.

It is preferable that the imaging instruction is configured of a first imaging instruction and a second imaging instruction, and the first processor is configured to transmit the second imaging instruction to the imaging possible device that has not received the first imaging instruction.

It is preferable that the imaging device includes a rejection mode in which the imaging instruction is not received, and the first processor is configured to not transmit the imaging instruction to the imaging possible device that is set to the rejection mode.

It is preferable that the imaging device transmits angle-of-view information to the first processor, and the first processor is configured to determine whether or not the target subject is included in an angle of view based on the position information of the target subject and the angle-of-view information of the imaging possible device.

It is preferable that in a case where the target subject is determined to be included in the angle of view, the imaging instruction is transmitted to the imaging possible device.

It is preferable that the first processor is configured to transmit, to the imaging possible device determined that the target subject is included in the angle of view, a non-explicit imaging instruction in which the imaging instruction is not notified to an imaging person, and transmit, to the imaging possible device determined that the target subject is not included in the angle of view, an explicit imaging instruction in which the imaging instruction is notified to the imaging person.

It is preferable that the first processor is configured to acquire information related to a moving distance of the target subject based on the position information of the target subject and transmit, to the imaging possible device to which the imaging instruction is transmitted, an imaging instruction cancellation notification for invalidating the imaging instruction, based on the information related to the moving distance.

It is preferable that the target subject is configured of a first target subject and a second target subject, the imaging instruction is configured of a first imaging instruction for the first target subject and a second imaging instruction for the second target subject, and the first processor is configured to acquire a distance between the first target subject and the second target subject based on the position information of the first target subject and the position information of the second target subject, and transmit the second imaging instruction to the imaging possible device that has received the first imaging instruction, based on information of the distance.

It is preferable that the imaging device transmits, to the first processor, operation information indicating that the imaging device is during imaging, and the first processor is configured to transmit, to the imaging possible device that is during the imaging, a non-explicit imaging instruction in which the imaging instruction is not notified to an imaging person and transmit, to the imaging possible device that is not during the imaging, an explicit imaging instruction in which the imaging instruction is notified to the imaging person.

It is preferable that the first processor is configured to end processing of the imaging linking system in a case where a time equal to or larger than a threshold value has elapsed from the reception of the imaging request.

It is preferable that the first processor is configured to include a memory that stores individual recognition information for specifying the target subject, and the first processor or the second processor is configured to perform a notification display of the target subject in a captured image based on the individual recognition information.

It is preferable that the first processor is configured to provide, to the imaging device that has sent the imaging request, an authority to browse the captured image transmitted to the first processor.

It is preferable that the second processor is configured to receive the imaging instruction, receive an image acquisition instruction from an imaging person in response to the imaging instruction or receive an image acquisition instruction that is output in response to the imaging instruction, acquire a captured image of the target subject in response to the image acquisition instruction, and transmit the captured image to the first processor together with information related to the imaging request.

It is preferable that the first processor is configured to receive an evaluation for the captured image transmitted to the first processor.

According to another aspect of the present invention, there is provided a server device that configures an imaging linking system in which an imaging device images a target subject possessing a tracker in a linked manner, the server device comprising a first processor, in which the first processor is configured to receive an imaging request for the target subject, acquire position information of the target subject based on a sending signal of the tracker, acquire position information of the imaging device, specify an imaging possible device capable of imaging the target subject among the imaging devices based on the position information of the target subject and the position information of the imaging device, and transmit an imaging instruction for the target subject to the imaging possible device.

According to still another aspect of the present invention, there is provided an imaging device that images a target subject possessing a tracker in a linked manner, the imaging device comprising a second processor, in which the second processor is configured to receive an imaging instruction to image the target subject, receive an image acquisition instruction from an imaging person in response to the imaging instruction or receive an image acquisition instruction output in response to the imaging instruction, acquire a captured image of the target subject in response to the image acquisition instruction, and transmit the captured image to a server device together with information related to an imaging request.

According to still another aspect of the present invention, there is provided an imaging linking method in which an imaging device images a target subject sending position information, the imaging linking method comprising, by a first processor, a step of specifying an imaging possible device capable of performing imaging, a step of transmitting an imaging instruction for the target subject to the imaging possible device based on the position information of the target subject, and, by a second processor, a step of receiving the imaging instruction.

According to still another aspect of the present invention, there is provided a program for executing an imaging linking method in which an imaging device images a target subject sending position information, the program causing a first processor to execute a step of specifying an imaging possible device capable of performing imaging, and a step of transmitting an imaging instruction for the target subject to the imaging possible device based on the position information of the target subject, and a second processor to execute a step of receiving the imaging instruction.

DESCRIPTION OF THE PREFERRED EMBODIMENTS

Hereinafter, preferred embodiments of an imaging linking system, a server device, an imaging device, an imaging linking method, and a program according to the present invention will be described with reference to accompanying drawings.

<Imaging Support System>

Figure 1:
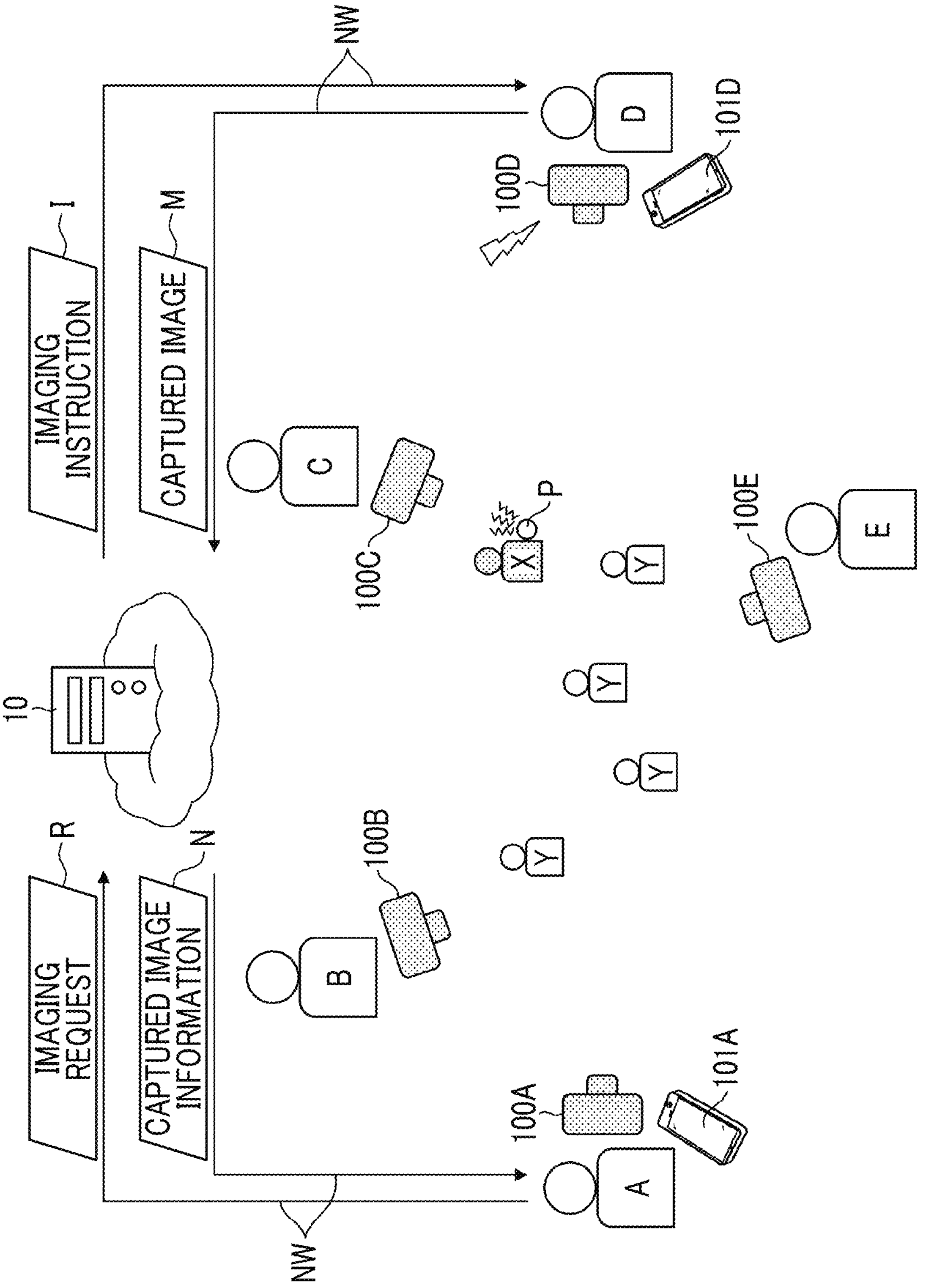
FIG. 1 is a conceptual diagram for describing a case where an imaging linking system is used.

FIG. 1 is a conceptual diagram for describing a case where an imaging linking system 1 according to the embodiment of the present invention is used.

The imaging linking system 1 is configured of a server device 10 and a plurality of imaging devices 100A to 100E. For example, imaging persons A to E who hold the respective imaging devices 100A to 100E are guardians (parents) who try to image a photograph of a child in an event such as a sports day. Further, a subject Y and a subject X are participants in the event such as the sports day and are, for example, children. The imaging persons A to E are located at respective imaging places to image the subject Y and the subject X, for example, at an event venue such as a school ground.

Here, the imaging person A is the guardian of the subject X and attempts to acquire a captured image of the subject X. However, the imaging person A does not always locate at a best imaging position of the subject X. That is, the other imaging persons B to E may be located at a good imaging position for imaging the subject X. Further, the imaging person A may want to acquire the captured image obtained by imaging the subject X from a viewpoint different from the imaging position of the imaging person A.

In such a case, with the imaging linking system 1 according to the embodiment of the present invention, not only the imaging device 100A held by the imaging person A but also the imaging devices 100B to 100E held by the imaging persons B to E can be linked to acquire the captured image of the subject X.

In the above description, the imaging devices 100A to 100E to be registered are described in relation to the imaging devices held by the respective imaging persons A to E, but the imaging devices to be registered in the imaging linking system 1 are not limited to the imaging devices held by the imaging persons A to E. For example, a stationary automatic imaging camera can also be registered in the imaging linking system 1. For example, it is possible to register a plurality of stationary pan-tilt type cameras in advance and transmit an imaging instruction I, which will be described below, to the stationary pan-tilt type cameras to image the subject X.

In the following, the server device 10 and the imaging devices 100A to 100E constituting the imaging linking system 1 will be described below. In the following description, in a case where a representative imaging device is described for the imaging devices 100A to 100E, the imaging devices 100A to 100E will be described as an imaging device 100.

<Server Device>

The server device 10 according to the embodiment of the present invention will be described. As shown in FIG. 1, the server device 10 is provided on, for example, a cloud. The server device 10 receives an imaging request R via a network NW, and transmits the imaging instruction I to the imaging device 100 specified as an imaging possible device among the imaging devices 100A to 100E. In the case of FIG. 1, the imaging device 100D is specified as the imaging possible device.

Figure 2:
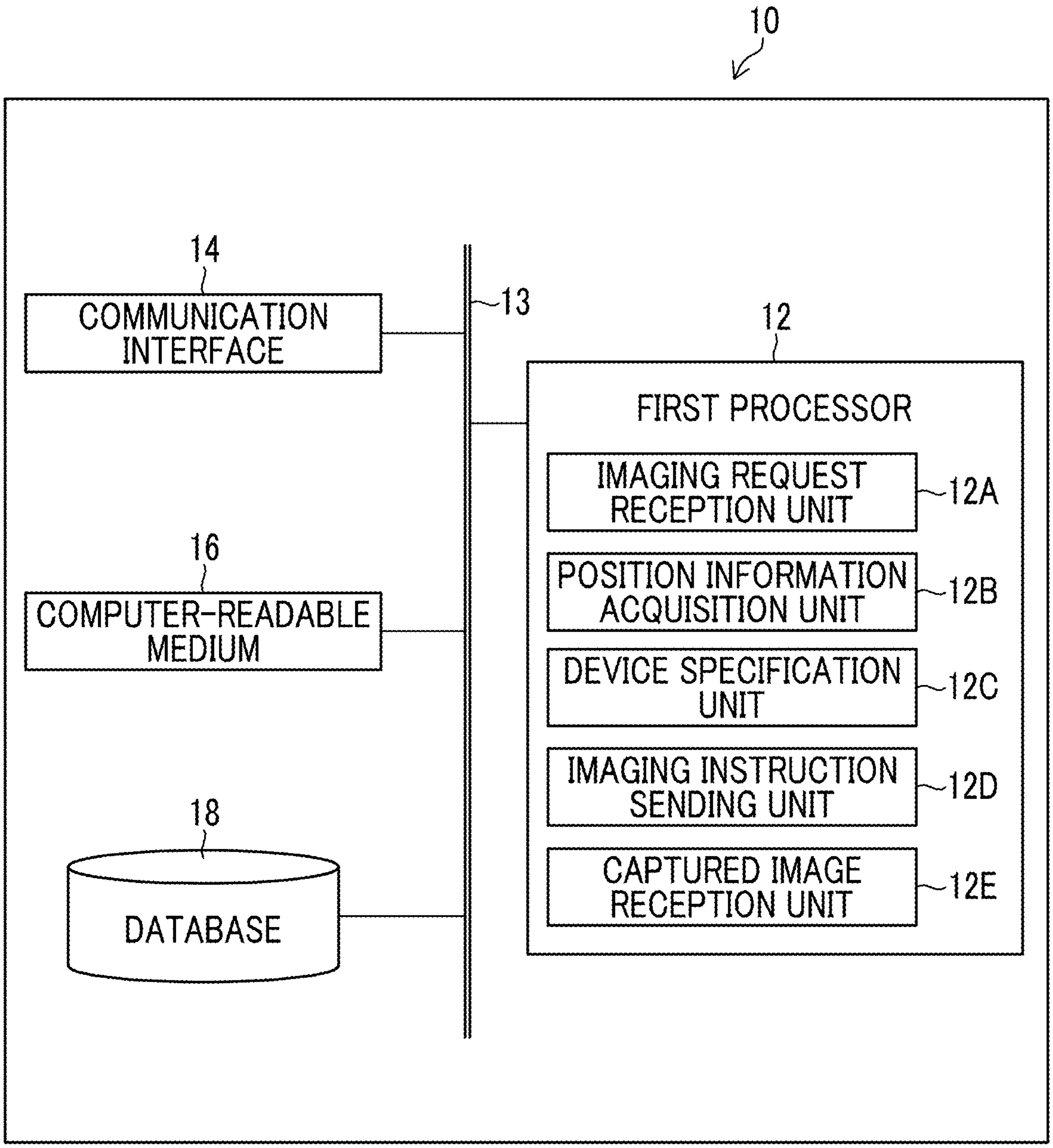
FIG. 2 is a functional block diagram for describing functions of a server device.

FIG. 2 is a functional block diagram for describing functions of the server device 10. Further, FIG. 3 shows a storage configuration example of a database 18 of the server device 10.

The server device 10 comprises a first processor 12, a communication interface 14, a computer-readable medium 16, and the database 18.

First, in a case where the imaging linking system 1 is used, use registration of a target subject imaged by the imaging linking system 1 and the imaging devices 100A to 100D will be described. The use registration of the target subject and the imaging devices 100A to 100D is stored in the database 18 of the server device 10. As shown in FIG. 3, target subject information, imaging person information, and a captured image M are stored in association with each other. The target subject information and the imaging person information are stored before the imaging linking system 1 is used.

Figure 3:
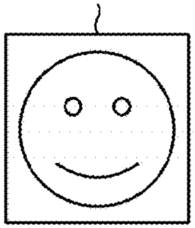
FIG. 3 is a table showing a storage configuration example of a database of the server device.

FIG. 3 shows a case where the use registration of the subject X (refer to FIG. 1) as the target subject is performed. The target subject information includes a face image FA (individual recognition information) of the subject X and information related to a tracker P held by the subject X. The subject X possesses the tracker P that sends position information. The tracker P is not particularly limited as long as the tracker P is a device that sends the position information of the subject X. For example, an AirTag (registered trademark) manufactured by Apple (registered trademark), Inc., a global positioning system (GPS) device, or the like may be used as the tracker P. The tracker P may transmit the position information of the subject X to the server device 10 via the imaging devices 100A to 100E, or may directly transmit the position information of the subject X to the server device 10.

Further, the face image FA of the subject X is used in a case where the subject X is specified by an individual recognition technique. For example, in the server device 10 or the imaging device 100, the subject X is recognized by the face image FA in a live view image acquired by the imaging device 100. For example, these pieces of target subject information are registered in the database 18 of the server device 10 via the network NW, for example, by the imaging person A, who is the guardian of the subject X, using the imaging device 100A.

The imaging person information includes information related to the imaging persons A to E and the imaging devices 100A to 100E to be linked. Further, in a case where the imaging persons A to E hold another terminal, such as a smartphone, information on the terminal held by the imaging persons A to E is also included. In the case shown in FIG. 3, the imaging person A holds the imaging device 100A and a terminal 101A, and the imaging person D holds the imaging device 100D and a terminal 101D. The imaging person information is registered in the database 18 of the server device 10 via the network NW, for example, by the respective imaging persons A to E using the imaging devices 100A to 100E.

Further, the database 18 stores the captured image M (refer to FIG. 1) captured by the linked imaging device 100. In the case shown in FIG. 3, the imaging person D acquires the captured image M of the subject X by the imaging device 100D. The captured image M is transmitted to the server device 10 via the network NW to be stored in the database 18. The captured image M is stored in the database 18 with accessory information indicating that the captured image M is obtained by imaging the subject X in response to the imaging request R. In a case where the captured image M is stored in the database 18, captured image information N, which is information related to the captured image M, is transmitted to the imaging person A (imaging device 100A) who has transmitted the imaging request R.

The imaging person A acquires an authority to browse and acquire the captured image M stored in the database 18 by the imaging device 100A or the terminal 101A. The imaging person A can browse and acquire only the captured image M captured based on the imaging request R, and cannot browse and acquire other captured images. Further, the imaging person A can assign an evaluation point to the captured image M, which is a product for the imaging request R. The imaging person who captures the captured image with a high evaluation point is charged a lower use fee for the imaging linking system 1 or is provided with a service of printing the captured image. Further, the same advantage may be provided to the imaging person who acquires a large number of captured images. In this manner, a motivation of the imaging person to acquire the captured image M for the imaging instruction I may be provided by various methods.

Returning to FIG. 2, the first processor 12 is configured of a central processing unit (CPU). Further, the first processor 12 may be configured by including a graphics processing unit (GPU). The first processor 12 is connected to the computer-readable medium 16, the communication interface 14, and the database 18 via a bus 13. The first processor 12 executes a dedicated program stored in the computer-readable medium 16 to realize various functions.

The first processor 12 realizes the functions of an imaging request reception unit 12A, a position information acquisition unit 12B, a device specification unit 12C, an imaging instruction sending unit 12D, and a captured image reception unit 12E.

The imaging request reception unit 12A receives the imaging request R for the subject X, which is the target subject. The imaging person A transmits the imaging request R to the server device 10 via the network NW by using the held imaging device 100A or terminal 101A, and the imaging request reception unit 12A receives the imaging request R via the communication interface 14.

The position information acquisition unit 12B acquires the position information of the subject X based on a sending signal sent from the tracker P held by the subject X. The tracker P transmits the sending signal related to the position information of the subject X to the server device 10 directly or via the imaging devices 100A to 100D, and the position information acquisition unit 12B receives the sending signal related to the position information of the subject X to acquire a position of the subject X. Further, the position information acquisition unit 12B also acquires the position information of the registered imaging devices 100A to 100E. The position information acquisition unit 12B acquires the position information output from a position information output unit 122 (refer to FIG. 4) of the imaging device 100.

The device specification unit 12C specifies the imaging possible device capable of imaging the subject X. The device specification unit 12C specifies the imaging possible device in various aspects. The specification of the imaging possible device by the device specification unit 12C will be described in detail below.

The imaging instruction sending unit 12D transmits the imaging instruction I to the imaging possible device specified by the device specification unit 12C. The imaging instruction sending unit 12D transmits the imaging instruction I to all the imaging devices 100A to 100E in a case where all the registered imaging devices 100A to 100E are specified as the imaging possible devices, and selectively transmits the imaging instruction I in a case where the imaging possible device is selectively specified from among the registered imaging devices 100A to 100E. The imaging instruction sending unit 12D transmits the imaging instruction I to the imaging possible device by the network NW, via a communication interface 114. The imaging instruction I includes assistance for framing to the subject X. The server device 10 calculates a direction of the subject X with respect to the imaging device 100 from a position of the imaging device 100 and the position of the subject X for each fine time, acquires position or direction information of the subject X based on posture information of the imaging device 100, and displays the position or direction information of the subject X on a display unit 118 (refer to FIG. 4) of the imaging device 100 to perform the assistance for framing. In the live view image acquired by the imaging device 100, the individual recognition may be performed using the face image FA, the subject X may be accurately specified, and the display unit 118 may perform a notification display such as a frame for the subject X.

The captured image reception unit 12E receives the captured image M acquired based on the imaging instruction I. The captured image reception unit 12E receives the captured image M via the communication interface 14. Further, the captured image reception unit 12E stores the received captured image M in the database 18.

The computer-readable medium 16 includes a memory that is a main storage device and a storage that is an auxiliary storage device. For example, the computer-readable medium 16 may be a semiconductor memory, a hard disk drive (HDD) device, a solid state drive (SSD) device, or a plurality of combinations thereof. The computer-readable medium 16 stores various programs including a control program for integrally controlling the server device 10, data, and the like.

The communication interface 14 is a communication unit that performs wireless communication with the imaging device 100. The communication interface 14 transmits and receives information to and from the imaging devices 100A to 100E, for example, by the network NW such as the Internet.

<Imaging Device>

Next, the imaging device will be described. In the following, the imaging devices 100A to 100E will be representatively described as the imaging device 100, but the imaging devices 100A to 100E have the same configuration.

Figure 4:
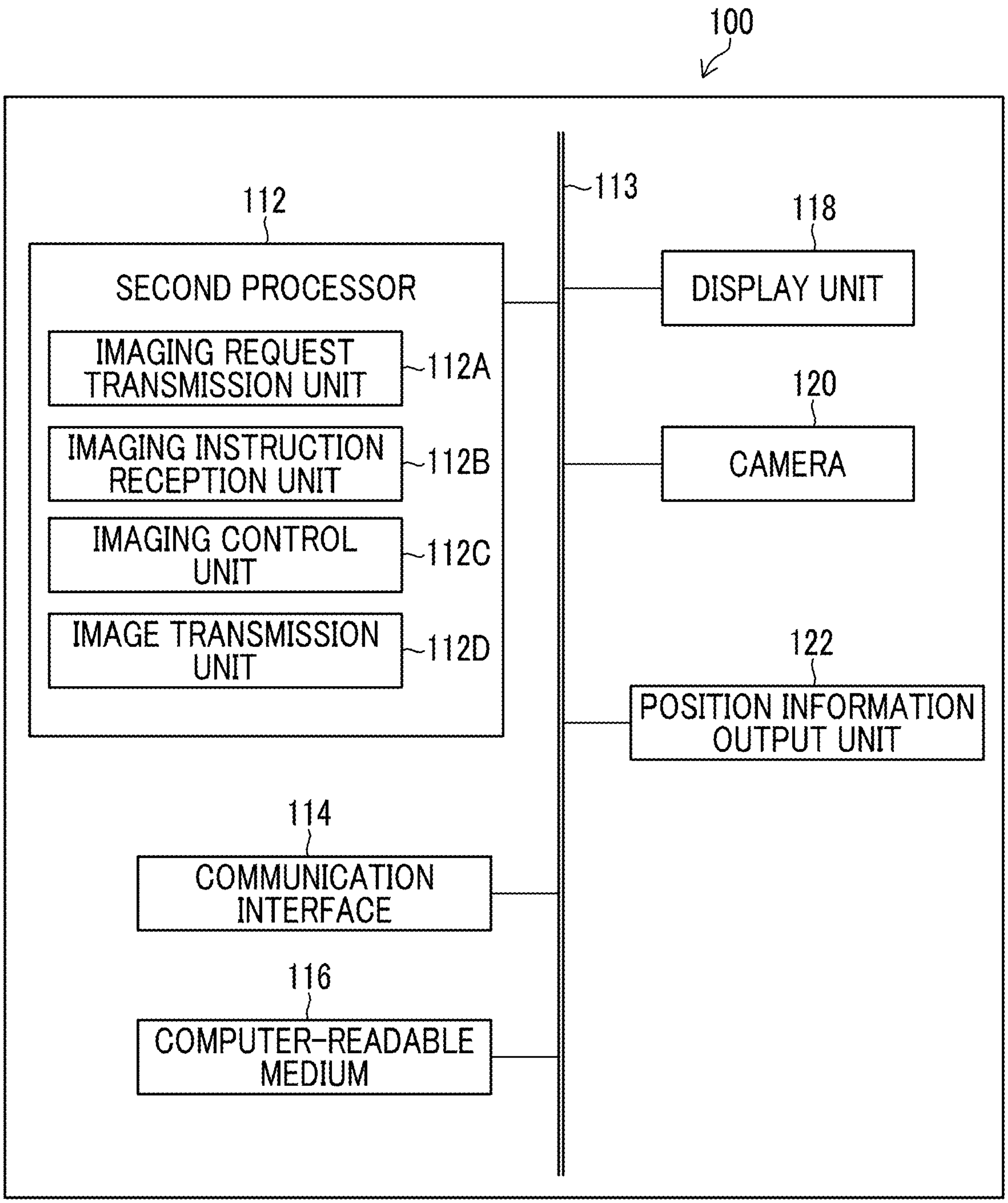
FIG. 4 is a functional block diagram for describing functions of an imaging device.

FIG. 4 is a functional block diagram for describing functions of the imaging device 100A.

The imaging device 100A comprises a second processor 112, the communication interface 114, a computer-readable medium 116, the display unit 118, a camera 120, and the position information output unit 122.

The second processor 112 is configured of a central processing unit (CPU). Further, the second processor 112 may be configured by including a graphics processing unit (GPU). The second processor 112 is connected to the communication interface 114, the computer-readable medium 116, the display unit 118, the camera 120, and the position information output unit 122 via a bus 113. The second processor 112 executes a dedicated program stored in the computer-readable medium 116 to realize various functions.

The second processor 112 executes a program stored in the computer-readable medium 116 to realize various functions. The second processor 112 realizes functions of an imaging request transmission unit 112A, an imaging instruction reception unit 112B, an imaging control unit 112C, and an image transmission unit 112D.

The imaging request transmission unit 112A transmits the imaging request R by the network NW via the communication interface 114. The imaging person A transmits the imaging request R for the subject X holding the tracker P from the registered imaging device 100A to the server device 10. The imaging request R can also be transmitted by, for example, the terminal 101A on which a dedicated application is installed. In a case where the imaging request R is transmitted, a notification is made that the imaging request R is transmitted to the imaging devices 100B to 100E held by the registered other imaging persons B to E. In a case where the terminal 101D is also registered like the imaging device 100D, a notification is made that the imaging request R is also transmitted to the terminal 101D.

The imaging instruction reception unit 112B receives the imaging instruction I transmitted from the server device 10. As described above, the server device 10 transmits the imaging instruction I to the imaging device 100 specified as the imaging possible device. The imaging instruction reception unit 112B receives the imaging instruction I via the communication interface 114. The imaging instruction I includes information for assisting the framing to image the subject X, and the display unit 118 displays the information for assisting the framing to the subject X.

The imaging control unit 112C acquires the captured image M of the target subject in response to an image acquisition instruction. The imaging person presses a shutter button (not shown), which is provided in the imaging device 100, to transmit the image acquisition instruction to the imaging control unit 112C. Further, the image acquisition instruction may be transmitted from the imaging instruction reception unit 112B to the imaging control unit 112C in response to the reception of the imaging instruction I by the imaging instruction reception unit 112B. In a case where the image acquisition instruction is received, the imaging control unit 112C controls the camera 120 to cause the camera 120 to acquire the captured image M of the target subject.

The camera 120 is configured of a known imaging device. The captured image M is acquired by the control of the imaging control unit 112C. The camera 120 can acquire a still image and a motion picture.

The image transmission unit 112D transmits, to the server device 10, the captured image M captured in response to the imaging instruction I. In a case where the captured image M is transmitted, the image transmission unit 112D transmits the captured image M to the server device 10 together with information indicating that the captured image M to be transmitted is the captured image M acquired in response to the imaging request R.

The communication interface 114 is a communication unit that performs wireless communication. For example, the communication interface 114 transmits and receives information to and from the server device 10 by the network NW such as the Internet.

The computer-readable medium 116 includes a memory that is a main storage device and a storage that is an auxiliary storage device. For example, the computer-readable medium 116 may be a semiconductor memory, a hard disk drive (HDD) device, a solid state drive (SSD) device, or a plurality of combinations thereof.

The display unit 118 is configured of, for example, a display. Further, the display unit 118 comprises a touch panel and also functions as an input unit. The display unit 118 displays the information for assisting the framing to the subject X, which is included in the imaging instruction I received by the imaging instruction reception unit 112B.

The position information output unit 122 outputs information related to the position and posture of the imaging device 100A. The position information output unit 122 is configured of, for example, a global positioning system (GPS) receiver, an acceleration sensor, a geomagnetic sensor, and a gyro sensor. The device constituting the position information output unit 122 is not particularly limited, and a device that outputs the information related to the position and posture of the imaging device 100A is used.

The hardware structures of the first processor 12 and the second processor 112 in the server device 10 and the imaging device 100 described above may be the following various processors. The various processors include a central processing unit (CPU) which is a general-purpose processor that executes software (program) to function as various processing units, a programmable logic device (PLD) which is a processor whose circuit configuration can be changed after manufacturing such as a field programmable gate array (FPGA), a dedicated electric circuit which is a processor having a circuit configuration specifically designed to execute specific processing such as an application specific integrated circuit (ASIC), and the like.

One processing unit may be configured of one of these various processors or may be configured of two or more processors of the same type or different types (for example, a plurality of FPGAs or a combination of a CPU and an FPGA). Alternatively, a plurality of processing units may be composed of one processor. As an example of constituting the plurality of processing units by one processor, first, there is a form in which one processor is composed of a combination of one or more CPUs and software, as represented by a computer such as a client or a server, and the one processor functions as the plurality of processing units. Second, there is a form in which a processor that realizes the functions of the entire system including the plurality of processing units by one integrated circuit (IC) chip is used, as represented by a system on chip (SoC) or the like. In this manner, the various processing units are configured using one or more of the various processors as a hardware structure.

Further, the hardware structure of these various processors is more specifically an electric circuit (circuitry) in which circuit elements such as semiconductor elements are combined.

As described above, the imaging linking system 1 is configured of the server device 10 and the imaging device 100, and images the subject X, which is the target subject.

Next, embodiments of an imaging linking method using the imaging linking system 1 will be described. The imaging linking method is performed by the first processor 12 and the second processor 112 of the imaging linking system 1 implementing a program.

First Embodiment

First, a first embodiment will be described. In the present embodiment, a relative distance between the imaging devices 100A to 100E and the subject X is calculated based on the position information of the imaging devices and the position information of the subject X, and a device that performs a notification of the imaging instruction I is decided according to the relative distance.

Figure 5:
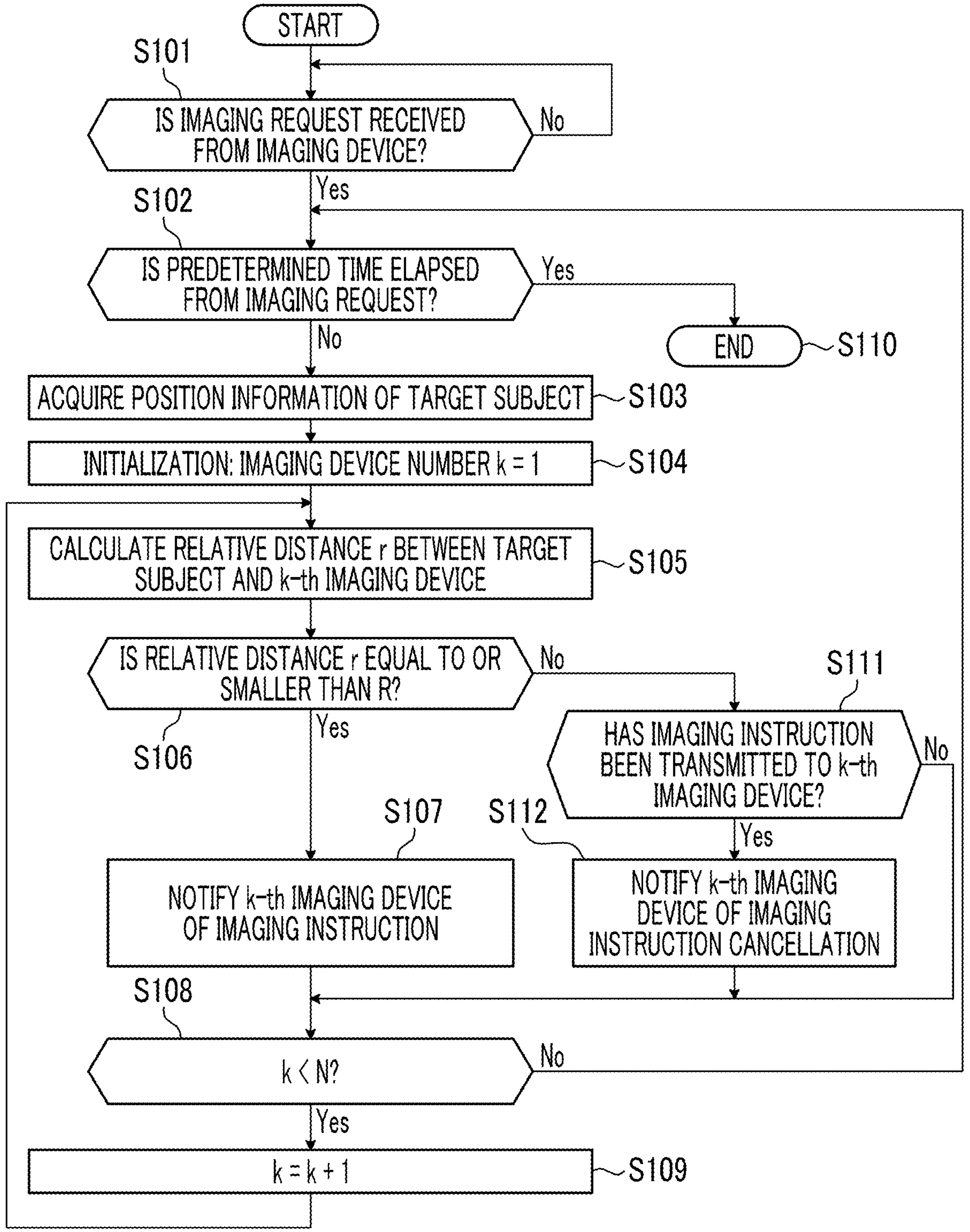
FIG. 5 is a diagram showing an operation flow of the imaging linking system.

FIG. 5 is a diagram showing an operation flow of the imaging linking system 1 according to the present embodiment.

First, the imaging person A transmits the imaging request R for the subject X to the server device 10 by the imaging request transmission unit 112A of the imaging device 100A. The imaging request reception unit 12A of the server device 10 receives the imaging request R for the subject X from the imaging device 100A (step S101).

The imaging request reception unit 12A stores a time point at which the imaging request R is received. In a case where a time (for example, 3 minutes) equal to or larger than a threshold value t has elapsed from the time point at which the imaging request R is received (step S102), the imaging request reception unit 12A invalidates the imaging request R and ends the processing (step S110).

On the other hand, in a case where a predetermined time has not elapsed since the imaging request reception unit 12A receives the imaging request R, the position information acquisition unit 12B acquires the position information of the subject X from the tracker P held by the subject X (step S103).

Thereafter, the device specification unit 12C initializes an imaging device number k=1 (step S104). Thereafter, the device specification unit 12C assigns the imaging device number (k=1) to the imaging device randomly selected from the registered imaging devices 100A to 100E, acquires the position information of the imaging device to which the imaging device number is assigned, and calculates a relative distance r (step S105). The imaging device number k is provided without overlapping such that the processing is performed for all the registered imaging devices 100.

Figure 6:
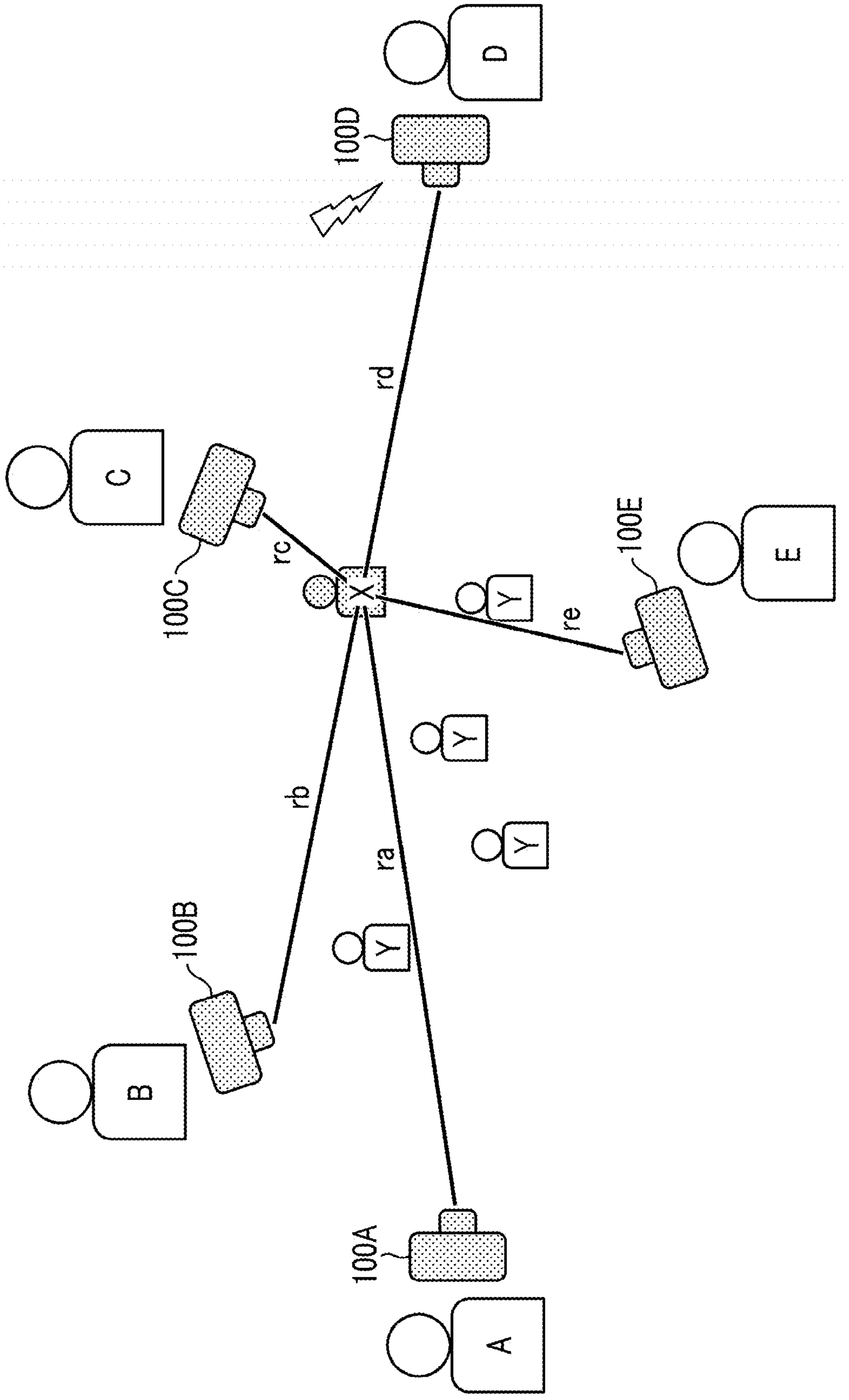
FIG. 6 is a diagram for describing calculation of a relative distance between a subject and the imaging device.

FIG. 6 is a diagram for describing calculation of relative distances ra to re between the subject X and the imaging devices 100A to 100E in the device specification unit 12C.

The device specification unit 12C acquires the relative distance ra between the imaging device 100A and the subject X, the relative distance rb between the imaging device 100B and the subject X, the relative distance rc between the imaging device 100C and the subject X, the relative distance rd between the imaging device 100D and the subject X, and the relative distance re between the imaging device 100E and the subject X, based on the position information output from the tracker P held by the subject X and the position information output from the position information output unit 122 of the imaging devices 100A to 100E. In the case described with reference to FIG. 6, the example has been described in which the relative distance ra between the imaging device 100A that sends the imaging request R and the subject X is also calculated, but the present invention is not limited thereto. For example, only the relative distances rb to re between the other imaging devices 100B to 100E that do not issue the imaging request R and the subject X may be calculated without calculating the relative distance ra between the imaging device 100A that sends the imaging request R and the subject X.

Returning to FIG. 5, the device specification unit 12C determines whether or not the acquired relative distance r is equal to or smaller than R (step S106: step of specifying imaging possible device). Here, R is a threshold value of the relative distance and is randomly set. The device specification unit 12C specifies the imaging device whose relative distance r is equal to or smaller than R, as the imaging possible device. The imaging instruction sending unit 12D transmits the imaging instruction I to the imaging possible device (step S107: step of transmitting imaging instruction). The imaging possible device receives the transmitted imaging instruction I (step of receiving imaging instruction).

On the other hand, in a case where the device specification unit 12C does not specify the imaging device 100 of a k-th imaging device number as the imaging possible device, the imaging instruction sending unit 12D determines whether or not the imaging instruction I has been transmitted to the imaging device 100 of the k-th imaging device number (step S111). In a case where the imaging instruction I has already been transmitted to the imaging device 100 of the k-th imaging device number, the imaging instruction sending unit 12D transmits an imaging instruction cancellation notification to the imaging device 100 of the k-th imaging device number (step S112). The imaging instruction cancellation notification is to invalidate the imaging instruction I that has already been transmitted.

Thereafter, the device specification unit 12C determines whether or not the imaging device number k is smaller than N indicating the number of the registered imaging devices (step S108). In a case where the imaging device number k is smaller than N, the device specification unit 12C increments the imaging device number k (k=k+1) (step S109), and steps S105 to S108 and steps S111 and S112 are looped.

On the other hand, in a case where the imaging device number k is not smaller than N indicating the number of the registered imaging devices (in case of k=N), steps S102 to S109 and steps S111 and S112 are looped.

As described above, in the present embodiment, the device specification unit 12C calculates the relative distances ra to re between the subject X and the imaging devices 100A to 100E, specifies the imaging possible device based on the relative distances ra to re, and transmits the imaging instruction I to the imaging possible device. Accordingly, with the transmission of the imaging instruction I to the imaging device 100 close to the subject X, it is possible to suppress missed imaging and distribute a load such that the imaging instruction I is not concentrated on a specific imaging device.

In the first embodiment described above, the imaging instruction I is transmitted to the imaging device whose relative distance r is equal to or smaller than R, as the imaging possible device. However, as another aspect, all the relative distances r between the imaging devices 100A to 100E and the subject X may be calculated, the imaging devices up to an upper Q-th (for example, Q=3) in a case where the relative distances r are arranged in ascending order of the relative distances r may be specified as the imaging possible devices, and the imaging instruction I may be transmitted to the imaging possible devices. Further, the number of the imaging possible devices may be always displayed on the imaging device 100A or the terminal 101A of the imaging person A who issues the imaging request R. Accordingly, the imaging person A who issues the imaging request R can always understand the number of the imaging possible devices.

Second Embodiment

Next, a second embodiment will be described. In the present embodiment, the imaging possible device is specified according to a working situation of the imaging device 100. The working situation here indicates whether or not the other imaging instruction Ia (corresponding to first imaging instruction) is being responded.

Figure 7:
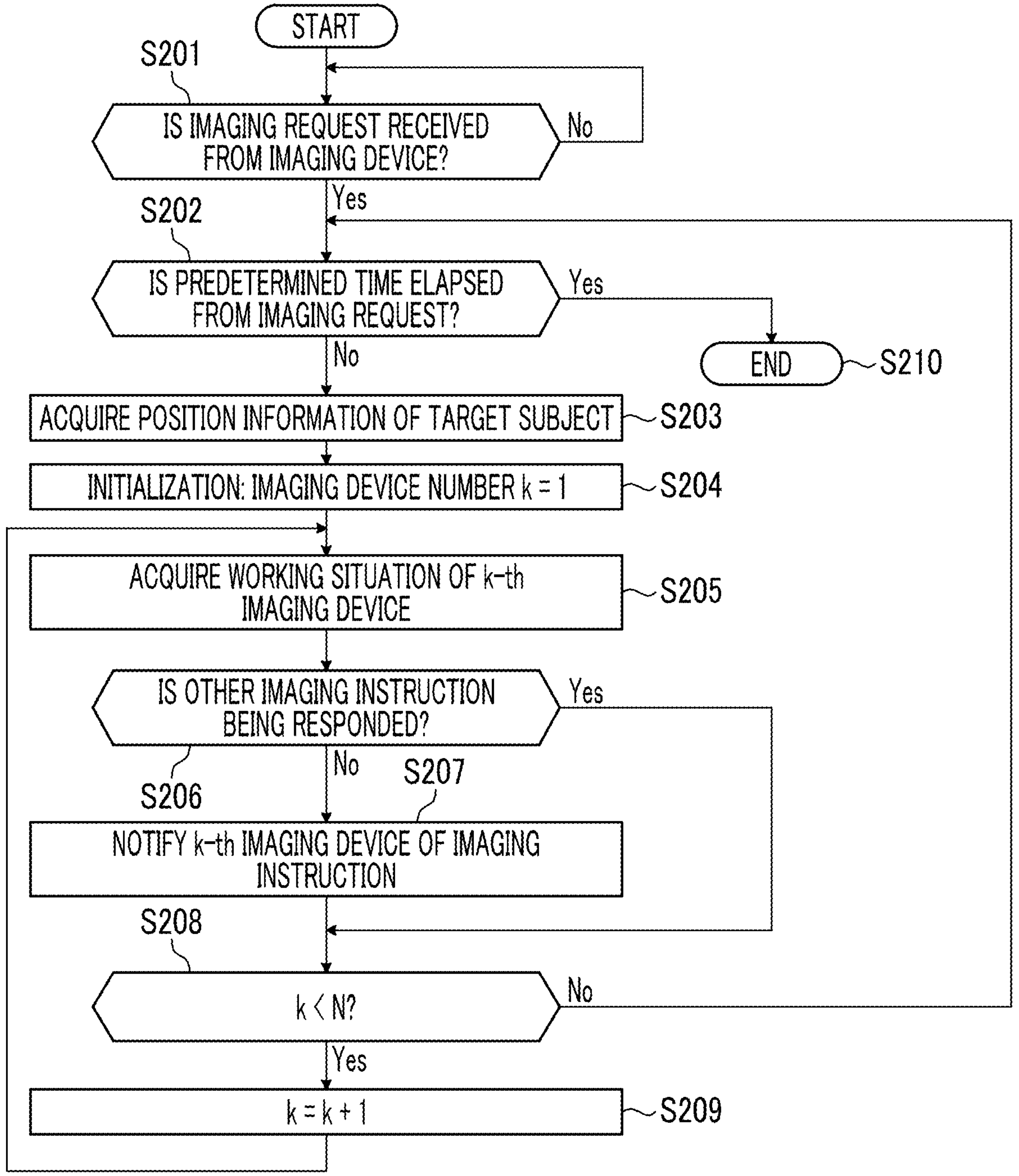
FIG. 7 is a diagram showing the operation flow of the imaging linking system.

FIG. 7 is a diagram showing the operation flow of the imaging linking system 1 of the present embodiment.

The imaging person A transmits the imaging request R for the subject X to the server device 10 by the imaging request transmission unit 112A. The imaging request reception unit 12A receives the imaging request R for the subject X from the imaging device 100A (step S201). The imaging request reception unit 12A calculates a time from the reception of the imaging request R (step S202). In a case where the predetermined time has elapsed, the imaging request R is invalidated and the processing ends (step S210). On the other hand, in a case where the predetermined time has not elapsed from the reception of the imaging request R, the position information acquisition unit 12B acquires the position information from the tracker P (step S203).

Next, the device specification unit 12C performs the initialization setting of the imaging device number k=1 (step S204). Thereafter, the device specification unit 12C assigns the imaging device number (k=1) to the randomly selected imaging device.

The device specification unit 12C acquires the working situation of the imaging device of the k-th imaging device number (step S205), and determines whether or not the imaging device of the k-th imaging device number is in response to the other imaging instruction Ia (step S206). Here, the device specification unit 12C acquires information indicating whether or not the imaging instruction Ia based on the other imaging request Ra is received, as the working situation of the imaging device. In a case where the imaging instruction reception unit 112B has already received the imaging instruction Ia, the imaging device 100 transmits, to the server device 10, an operation signal indicating that the other imaging instruction Ia is being responded. In a case where the imaging device of the k-th imaging device number does not respond to the other imaging instruction Ia, the device specification unit 12C transmits the imaging instruction I (second imaging instruction) to the imaging device of the k-th imaging device number (step S207).

Thereafter, the device specification unit 12C determines whether or not the imaging device number k is smaller than N indicating the number of the registered imaging devices (step S208). In a case where the imaging device number k is smaller than N, the device specification unit 12C increments the imaging device number k (k=k+1) (step S209), and steps S205 to S209 are looped. Further, in a case where the imaging device number k is not smaller than N indicating the number of the registered imaging devices (in case of k=N), steps S202 to S210 are looped.

As described above, in the present embodiment, the device specification unit 12C determines whether or not each of the imaging devices 100A to 100E is in response to the other imaging instruction Ia, specifies the imaging possible device according to the working situation, and transmits the imaging instruction I. Accordingly, in the present embodiment, it is possible to suppress concentration of the imaging instruction on a specific device and to reduce a load on the imaging person. The present embodiment may be implemented in combination with the first embodiment described above.

Third Embodiment

Next, a third embodiment will be described. In the second embodiment described above, the imaging instruction I is not transmitted to the imaging device being in response to the other imaging instruction Ia. However, in the present embodiment, the imaging instruction I is transmitted in a case where positions of two target subjects of the imaging instruction I and the imaging instruction Ia are close to each other.

Figure 8:
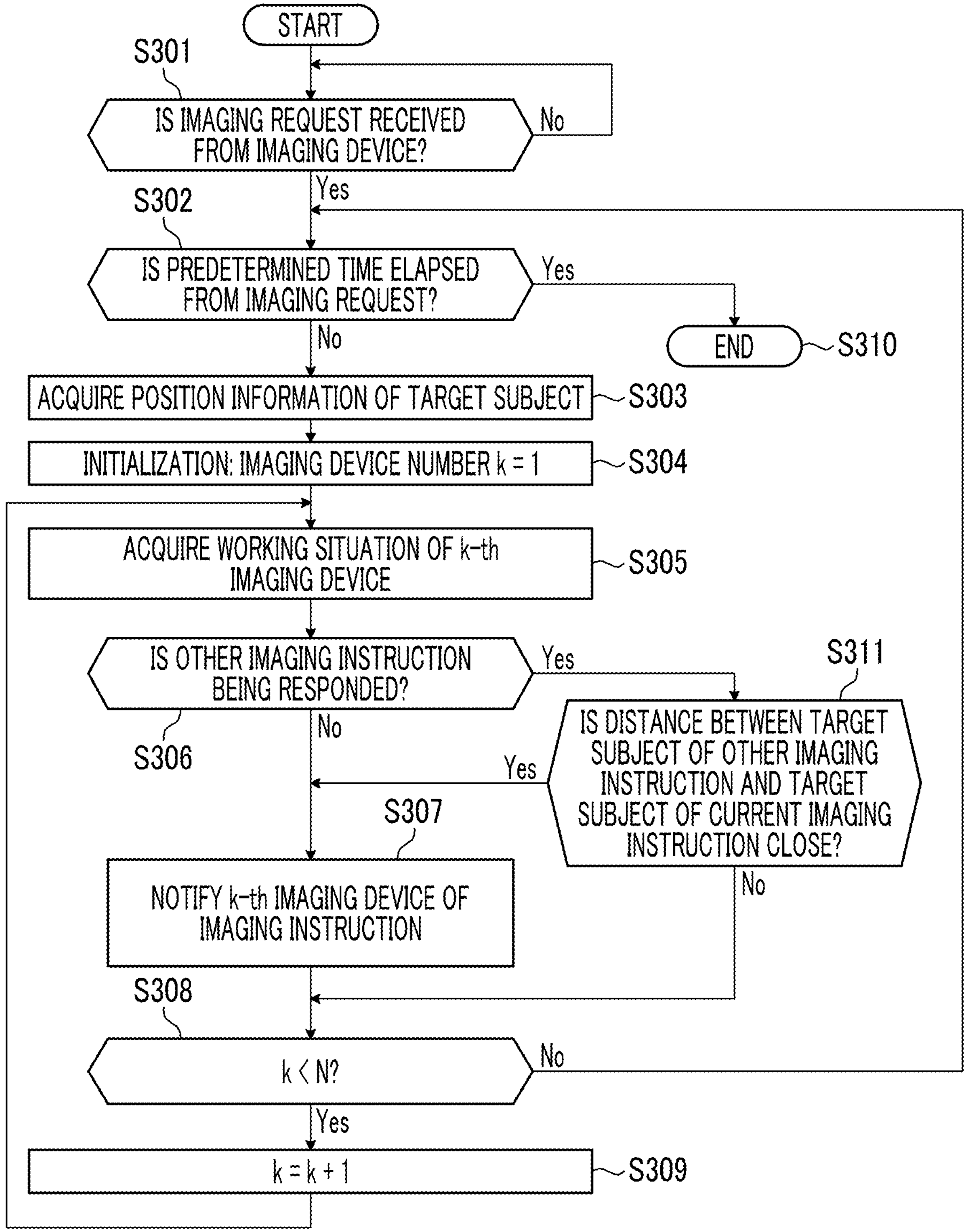
FIG. 8 is a diagram showing the operation flow of the imaging linking system.

FIG. 8 is a diagram showing the operation flow of the imaging linking system 1 of the present embodiment.

The imaging request reception unit 12A receives the imaging request R for the subject X from the imaging device 100A (step S301). The imaging request reception unit 12A calculates the time from the reception of the imaging request R (step S302). In a case where the predetermined time has elapsed, the imaging request R is invalidated and the processing ends (step S310).

On the other hand, in a case where the predetermined time has not elapsed from the reception of the imaging request R, the position information acquisition unit 12B acquires the position information from the tracker P (step S303).

Next, the device specification unit 12C performs the initialization setting of the imaging device number k=1 (step S304). Thereafter, the device specification unit 12C assigns the imaging device number (k=1) to the randomly selected imaging device.

The device specification unit 12C acquires the working situation of the imaging device 100 of the k-th imaging device number (step S305), and determines whether or not the imaging device of the k-th imaging device number is in response to the other imaging instruction Ia (first imaging instruction) (step S306). In a case where the imaging device 100 of the k-th imaging device number is in response to the other imaging instruction Ia, the device specification unit 12C performs the determination based on information on a distance between the target subject (first target subject) of the other imaging instruction Ia and the subject X (second target subject) of a current imaging instruction I (second imaging instruction) (step S311). For example, in a case where the distance between the target subject of the imaging instruction Ia and the subject X of the current imaging instruction I is a threshold value S (for example, 5 m), the imaging instruction I is transmitted even though the imaging device is in response to the other imaging instruction Ia (step S307).

As described above, in addition to the distance between the target subject of the imaging instruction Ia and the subject X of the imaging instruction I, the imaging device 100 or the server device 10 may perform the individual recognition processing on the live view image of the imaging device 100 to determine whether or not the two target subjects are present within an angle of view, and the device specification unit 12C may specify the imaging device as the imaging possible device. However, since the individual recognition processing cannot be performed well in a case where the target subject is shown in a backward manner, it is desirable to use this function in a supplementary manner in a case where the imaging possible device is specified based on the distance between the two target subjects.

In a case where the imaging device of the k-th imaging device number does not respond to the other imaging instruction Ia, the device specification unit 12C transmits the imaging instruction I to the imaging device of the k-th imaging device number (step S307).

Thereafter, the device specification unit 12C determines whether or not the imaging device number k is smaller than N indicating the number of the registered imaging devices 100 (step S308). In a case where the imaging device number k is smaller than N, the device specification unit 12C increments the imaging device number k (k=k+1) (step S309), and steps S305 to S309 are looped. Further, in a case where the imaging device number k is not smaller than N indicating the number of the registered imaging devices (in case of k=N), steps S302 to S310 are looped.

As described above, in the present embodiment, even in a case where the imaging device 100 is already in response to the other imaging instruction Ia, the imaging instruction I is transmitted in a case where the distance between the target subject of the imaging instruction Ia and the target subject (subject X) of the imaging instruction I is close. Accordingly, according to the present embodiment, it is possible to perform efficient imaging and suppress missed imaging.

Fourth Embodiment

Next, a fourth embodiment will be described. In the present embodiment, the imaging person can select, in the imaging device 100 of the imaging person, a "permission mode" in which the imaging instruction I is received or a "rejection mode" in which the imaging instruction I is not received, and the server device 10 specifies the imaging device in the "permission mode" as the imaging possible device and transmits the imaging instruction I.

Figure 9:
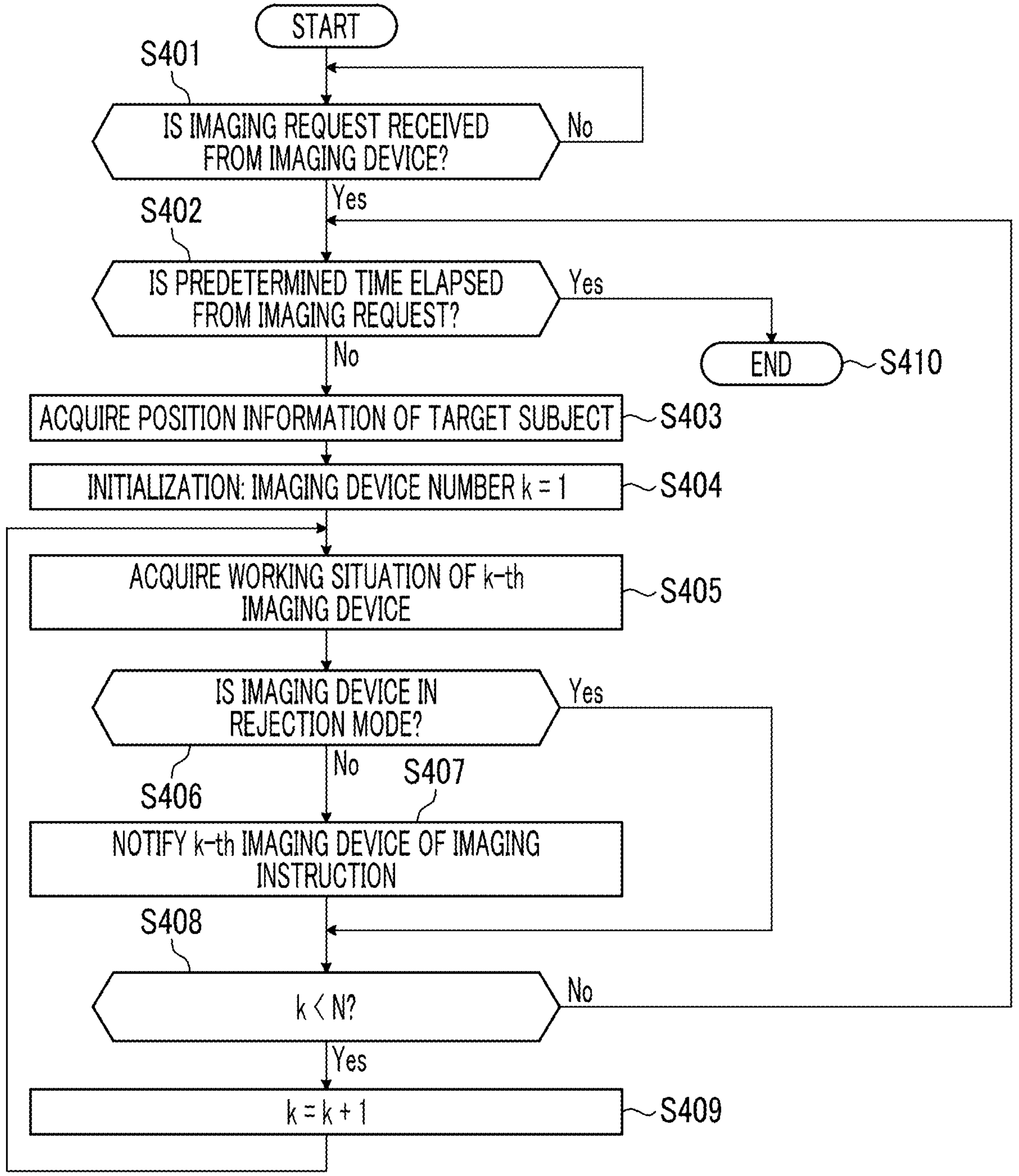
FIG. 9 is a diagram showing the operation flow of the imaging linking system.

FIG. 9 is a diagram showing the operation flow of the imaging linking system 1 of the present embodiment.

The imaging request reception unit 12A receives the imaging request R for the subject X from the imaging device 100A (step S401). The imaging request reception unit 12A calculates the time from the reception of the imaging request R (step S402). In a case where the predetermined time has elapsed, the imaging request R is invalidated and the processing ends (step S410).

On the other hand, in a case where the predetermined time has not elapsed from the reception of the imaging request R, the position information acquisition unit 12B acquires the position information from the tracker P (step S403).

Next, the device specification unit 12C performs the initialization setting of the imaging device number k=1 (step S404). Thereafter, the device specification unit 12C assigns the imaging device number (k=1) to the randomly selected imaging device.

The device specification unit 12C acquires the working situation of the imaging device of the k-th imaging device number (step S405). Here, the working situation represents setting situations of the "permission mode" and the "rejection mode" in the imaging devices 100A to 100E. The device specification unit 12C determines whether or not the imaging device of the imaging device number k is set to the "rejection mode" (step S406), specifies the imaging device as the imaging possible device in a case where the imaging device is not set to the "rejection mode", and transmits the imaging instruction I (step S407).

Thereafter, the device specification unit 12C determines whether or not the imaging device number k is smaller than N indicating the number of the registered imaging devices (step S408). In a case where the imaging device number k is smaller than N, the device specification unit 12C increments the imaging device number k (k=k+1) (step S409), and steps S405 to S409 are looped. Further, in a case where the imaging device number k is not smaller than N indicating the number of the registered imaging devices (in case of k=N), steps S402 to S410 are looped.

As described above, in the present embodiment, the imaging person can select, in the imaging device 100 of the imaging person, the "permission mode" in which the imaging instruction I is received or the "rejection mode" in which the imaging instruction I is not received, and the server device 10 transmits the imaging instruction I only to the imaging device in the "permission mode". Therefore, in the present embodiment, it is possible to select the imaging device to which the imaging instruction I is transmitted such that an imaging action of the imaging person is not hindered. The present embodiment may be implemented in combination with the first embodiment described above.

Fifth Embodiment

Next, a fifth embodiment will be described. In the present embodiment, in a case where the imaging device 100 is during imaging and the subject X is present within an imaging angle of view of the imaging device 100, the imaging device 100 is specified as the imaging possible device.

Figure 10:
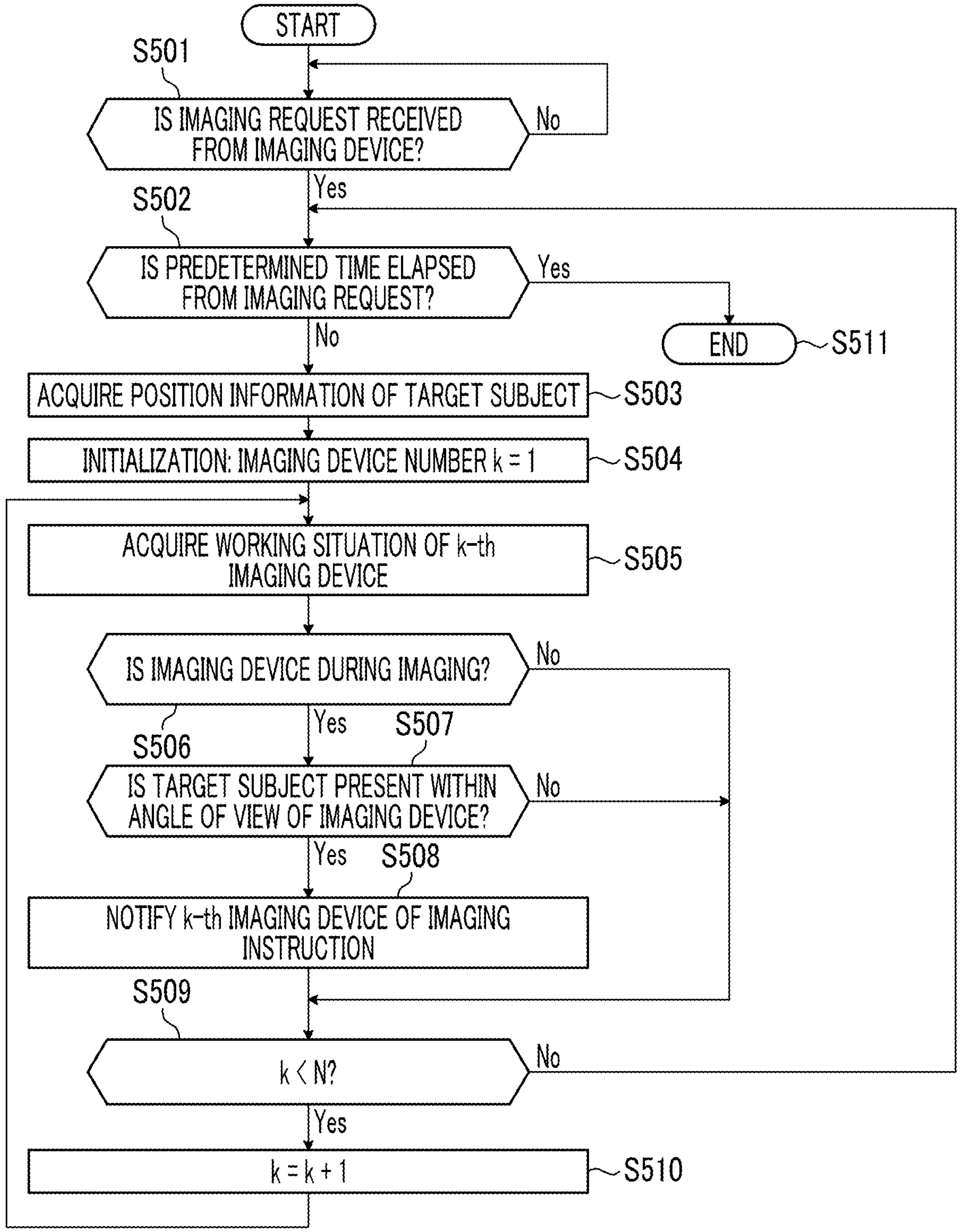
FIG. 10 is a diagram showing the operation flow of the imaging linking system.

FIG. 10 is a diagram showing the operation flow of the imaging linking system 1 of the present embodiment.

The imaging request reception unit 12A receives the imaging request R for the subject X from the imaging device 100A (step S501). The imaging request reception unit 12A calculates the time from the reception of the imaging request R (step S502). In a case where the predetermined time has elapsed, the imaging request R is invalidated and the processing ends (step S511).

On the other hand, in a case where the predetermined time has not elapsed from the reception of the imaging request R, the position information acquisition unit 12B acquires the position information from the tracker P (step S503).

Next, the device specification unit 12C performs the initialization setting of the imaging device number k=1 (step S504). Thereafter, the device specification unit 12C assigns the imaging device number (k=1) to the randomly selected imaging device.

The device specification unit 12C acquires the working situation of the imaging device of the k-th imaging device number (step S505). Here, the working situation is whether or not the imaging devices 100A to 100E are during imaging. In a case where the imaging devices 100A to 100E are during imaging, an in-imaging signal is transmitted to the server device 10. In a case where the imaging device of the k-th imaging device number is during imaging (step S506), the device specification unit 12C determines whether or not the subject X is present within the imaging angle of view of the imaging device of the k-th imaging device number (step S507).

Figure 11:
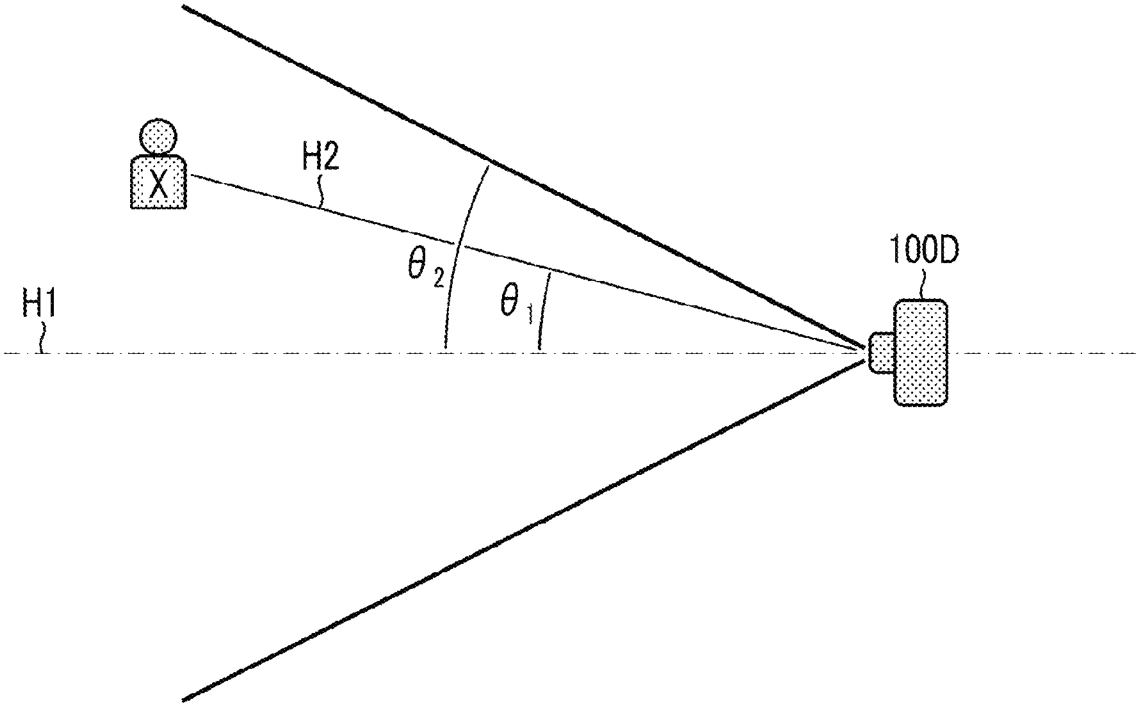
FIG. 11 is a diagram for describing determination of whether or not the subject is present within an imaging angle of view of the imaging device.

FIG. 11 is a diagram for describing the determination of whether or not the subject X is present within the imaging angle of view of the imaging device 100.

FIG. 11 shows the subject X and the angle of view of the imaging device 100D of the k-th imaging device number. Whether or not the subject X is present within the imaging angle of view can be calculated from (1) a direction of a lens optical axis H1 of the imaging device 100D (=camera posture), (2) a direction H2 of the subject X with respect to a position of the imaging device 100D, and (3) a focal length. The direction of the lens optical axis H1 and the focal length are transmitted, as angle-of-view information, from the imaging control unit 112C to the device specification unit 12C.

The direction of the lens optical axis H1 of the imaging device 100D ((1) described above) can be calculated from information from the acceleration sensor or the geomagnetic sensor provided in the imaging device 100D. Further, the direction H2 of the subject X with respect to the position of the imaging device 100D can be calculated based on the position information of the imaging device 100D and the position information of the subject X ((2) described above). A direction θ1 of the subject X with the direction of the lens optical axis H1 as a reference is calculated. Further, since a half value θ2 of a visual angle can be obtained from the focal length ((3) described above), in a case where an absolute value of θ1 is equal to or smaller than θ2, the subject X is present within the imaging angle of view of the imaging device 100D. In a case where even a part of a body of the subject X is included in the imaging angle of view, determination is made here that the subject X is included.

In a case where the relative distance r (refer to first embodiment) between the position of the subject X and the position of the imaging device 100D is long, the subject X is imaged to be small. Thus, it is desirable not to specify the imaging device 100D as the imaging possible device even in a case where the subject X is present within the imaging angle of view of the imaging device 100D.

Further, the imaging device 100 or the server device 10 may perform the individual recognition processing using the face image FA on the live view image of the imaging device 100 to determine whether or not the subject X is present. However, since the individual recognition processing may not be performed well in a case where the subject X is shown in a backward manner or the like, it is desirable to perform the individual recognition processing in a supplementary manner for a method of checking whether or not the subject X is present within the imaging angle of view described above.

In a case where the subject X is determined to be present within the imaging angle of view of the imaging device 100 of the imaging device number k, the device specification unit 12C specifies the imaging device 100 of the imaging device number k as the imaging possible device and transmits the imaging instruction I to the imaging possible device (step S508).

Thereafter, the device specification unit 12C determines whether or not the imaging device number k is smaller than N indicating the number of the registered imaging devices (step S509). In a case where the imaging device number k is smaller than N, the device specification unit 12C increments the imaging device number k (k=k+1) (step S510), and steps S505 to S510 are looped. Further, in a case where the imaging device number k is not smaller than N indicating the number of the registered imaging devices (in case of k=N), steps S502 to S510 are looped.

As described above, in the present embodiment, in a case where the imaging device 100 is during imaging and the subject X is present within the imaging angle of view of the imaging device 100, the device specification unit 12C specifies the imaging device 100 as the imaging possible device. Accordingly, in the present embodiment, it is possible to perform load distribution such that the imaging instruction I is not concentrated on a specific imaging device 100 while suppressing missed imaging.

Sixth Embodiment

Next, a sixth embodiment will be described. In the present embodiment, an explicit imaging instruction and a non-explicit imaging instruction are provided in the mode of the imaging instruction I. Here, the explicit imaging instruction is a mode in which the imaging instruction I is, for example, displayed on the display unit 118 of the imaging device to be notified to the imaging person of the imaging device 100. Further, the non-explicit imaging instruction is a mode in which the imaging instruction is not notified to the imaging person and the imaging device 100 automatically performs imaging in response to the imaging instruction without the imaging person being conscious of the imaging instruction. In a case where the imaging device 100 is not during imaging or in a case where the target subject is not present within the imaging angle of view even during imaging, the explicit imaging instruction is issued. In a case where the imaging device 100 is during imaging and the target subject is present within the imaging angle of view, the non-explicit imaging instruction is issued.

Figure 12:
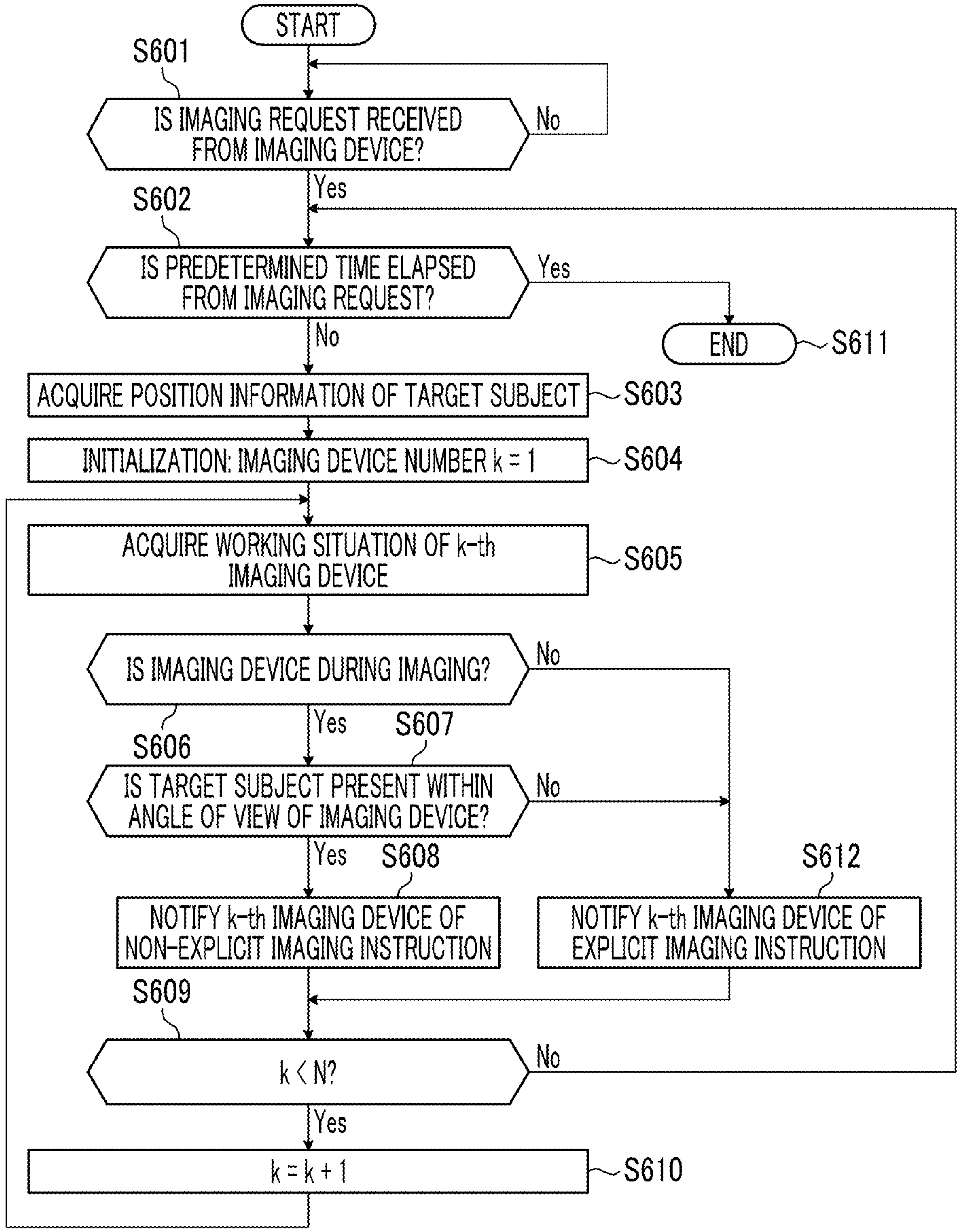
FIG. 12 is a diagram showing the operation flow of the imaging linking system.

FIG. 12 is a diagram showing the operation flow of the imaging linking system 1 of the present embodiment.

The imaging request reception unit 12A receives the imaging request R for the subject X from the imaging device 100A (step S601). The imaging request reception unit 12A calculates the time from the reception of the imaging request R (step S602). In a case where the predetermined time has elapsed, the imaging request R is invalidated and the processing ends (step S611).

On the other hand, in a case where the predetermined time has not elapsed from the reception of the imaging request R, the position information acquisition unit 12B acquires the position information from the tracker P (step S603).

Next, the device specification unit 12C performs the initialization setting of the imaging device number k=1 (step S604). Thereafter, the device specification unit 12C assigns the imaging device number (k=1) to the randomly selected imaging device.

The device specification unit 12C acquires the working situation (operation information) of the imaging device of the k-th imaging device number (step S605). Here, the working situation is information indicating whether or not the imaging devices 100A to 100E are during imaging.

In a case where the imaging device of the k-th imaging device number is during imaging (step S606), determination is made whether or not the target subject is present within the imaging angle of view of the imaging device of the k-th imaging device number (step S607).

In a case where the subject X is determined to be present within the imaging angle of view of the imaging device 100 of the imaging device number k, the device specification unit 12C transmits the non-explicit imaging instruction to the imaging device (step S608). In a case where the non-explicit imaging instruction is transmitted, the imaging control unit 112C receives the non-explicit imaging instruction and controls the camera 120 in response to the reception of the non-explicit imaging instruction to automatically capture the captured image M. On the other hand, in a case where the imaging device 100 is not during imaging and the target subject is not present within the imaging angle of view of the imaging device, the explicit imaging instruction I is transmitted to the imaging device 100 of the k-th imaging device number (step S612).

Thereafter, the device specification unit 12C determines whether or not the imaging device number k is smaller than N indicating the number of the registered imaging devices (step S609). In a case where the imaging device number k is smaller than N, the device specification unit 12C increments the imaging device number k (k=k+1) (step S610), and steps S605 to S610 and step S612 are looped. Further, in a case where the imaging device number k is not smaller than N indicating the number of the registered imaging devices (in case of k=N), steps S602 to S612 are looped.

As described above, in the present embodiment, the explicit imaging instruction and the non-explicit imaging instruction are provided in the mode of the imaging instruction I. Accordingly, in the present embodiment, the imaging can be automatically performed with the non-explicit imaging instruction, in addition to a case where the imaging is performed by the imaging person with the explicit imaging instruction, and thus it is possible to increase an imaging frequency and suppress missed imaging.

Seventh Embodiment

Next, a seventh embodiment will be described. In the present embodiment, a position x1 of the subject X at a time at which the imaging request R is issued is held, a position x2 of the subject X thereafter is always acquired, and the imaging request R is invalidated in a case where a moving distance of the subject X exceeds a predetermined value (threshold value L, for example, 50 m). Further, in a case where the imaging request R is invalidated, the imaging instruction cancellation for the imaging instruction I is notified to the imaging device 100 to which the imaging instruction I has been transmitted up to that point, and the processing ends.

Figure 13:
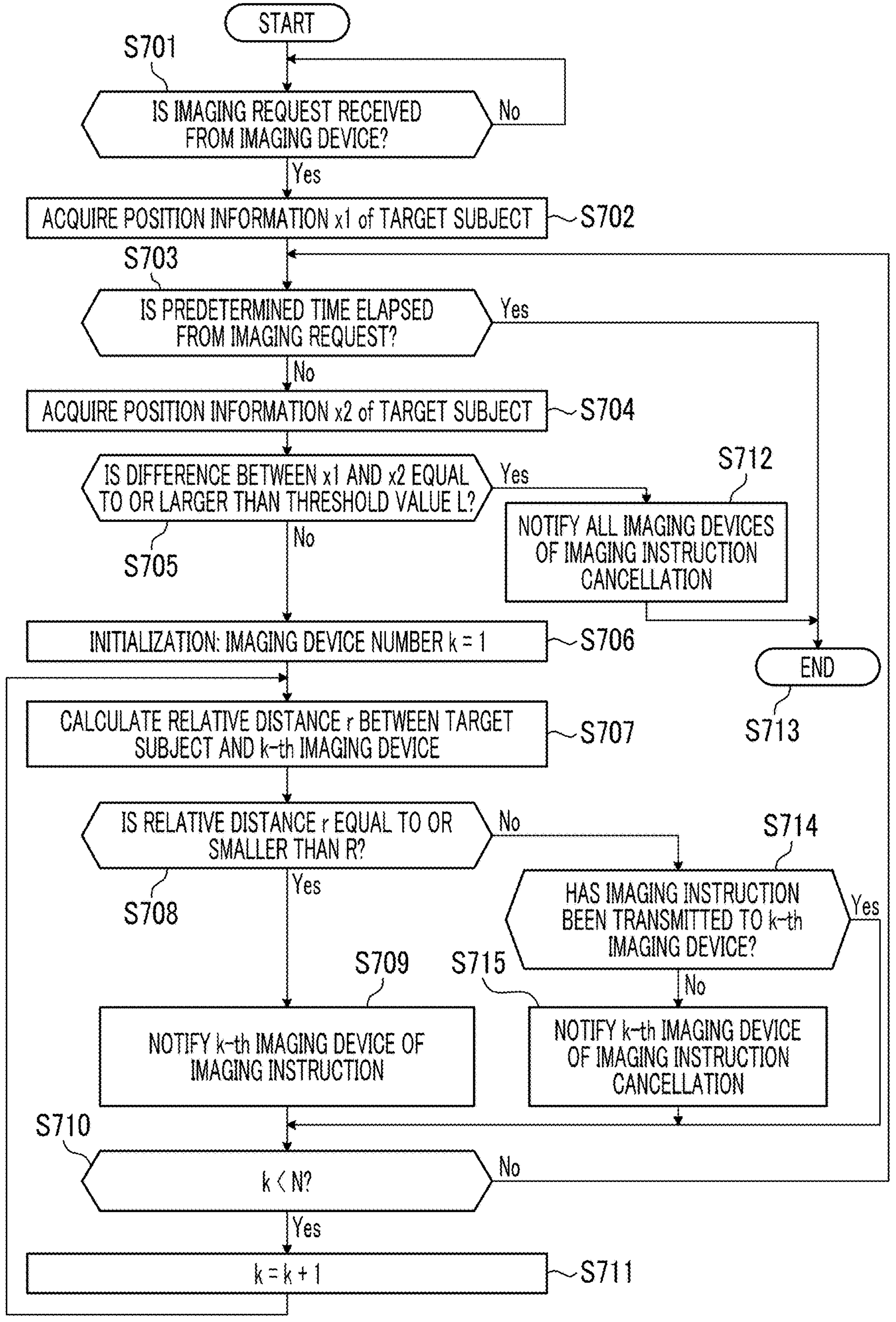
FIG. 13 is a diagram showing the operation flow of the imaging linking system.

FIG. 13 is a diagram showing the operation flow of the imaging linking system 1 of the present embodiment.

The imaging person A transmits the imaging request R for the subject X to the server device 10 by the imaging request transmission unit 112A. The imaging request reception unit 12A receives the imaging request R for the subject X from the imaging device 100A (step S701).

Thereafter, the position information acquisition unit 12B acquires the position information x1 of the subject X output from the tracker P (step S702). Thereafter, the imaging request reception unit 12A calculates the time from the reception of the imaging request R (step S703). In a case where the predetermined time has elapsed, the imaging request R is invalidated and the processing ends (step S713).

On the other hand, in a case where the predetermined time has not elapsed from the reception of the imaging request R, the position information acquisition unit 12B acquires current position information x2 of the subject X from the tracker P (step S704).

In a case where a difference between x1 and x2 is equal to or larger than a threshold value L (step S705), the position information acquisition unit 12B performs the imaging instruction cancellation notification to all the imaging devices (step S712), and ends the processing (step S713).

On the other hand, in a case where the difference between x1 and x2 is less than the threshold value L, steps S706 to S711 and steps S714 and S715 are performed as shown in FIG. 13. Since steps S706 to S711 and steps S714 and S715 are the same as steps S104 to S109 and steps S111 and S112 (refer to FIG. 5) described in the first embodiment, description thereof will not be repeated here.

As described above, in the present embodiment, in a case where the subject X is moved, by the threshold value L or more, from the position of the subject X at a time at which the imaging request R is issued, the imaging instruction cancellation is transmitted to the imaging devices 100A to 100E. Accordingly, in the present embodiment, in a case where the subject X has moved significantly from the position of the subject X at the time at which the imaging request R is issued, the imaging request R is canceled, and it is possible to perform efficient imaging.

Although the examples of the present invention have been described above, it is needless to say that the present invention is not limited to the embodiments described above and various modification examples can be made within a range not departing from the spirit of the present invention.

EXPLANATION OF REFERENCES

- 1: imaging linking system
- 10: server device
- 12: first processor
- 12A: imaging request reception unit
- 12B: position information acquisition unit
- 12C: device specification unit
- 12D: imaging instruction sending unit
- 12E: captured image reception unit
- 14: communication interface
- 16: computer-readable medium
- 18: database
- 112: second processor
- 112A: imaging request transmission unit
- 112B: imaging instruction reception unit
- 112C: imaging control unit
- 112D: image transmission unit
- 114: communication interface
- 116: computer-readable medium
- 118: display unit
- 120: camera
- 122: position information output unit

What is claimed is:

1. An imaging linking system in which an imaging device images a target subject that sends position information, the imaging linking system comprising:

a first processor configured to:

specify an imaging possible device capable of performing imaging; and transmit an imaging instruction for the target subject to the imaging possible device based on the position information of the target subject; and a second processor configured to:

receive the imaging instruction, wherein the imaging device transmits angle-of-view information to the first processor, and the first processor is configured to:

determine whether or not the target subject is included in an angle of view based on the position information of the target subject and the angle-of-view information of the imaging possible device;

transmit, to the imaging possible device determined that the target subject is included in the angle of view, a non-explicit imaging instruction in which the imaging instruction is not notified to an imaging person; and transmit, to the imaging possible device determined that the target subject is not included in the angle of view, an explicit imaging instruction in which the imaging instruction is notified to the imaging person.

2. The imaging linking system according to claim 1, further comprising:

a server device including the first processor.

3. The imaging linking system according to claim 1, wherein the first processor is configured to:

receive an imaging request for the target subject;

acquire the position information of the target subject based on a sending signal;

acquire position information of the imaging device;

specify the imaging possible device based on the position information of the target subject and the position information of the imaging device; and transmit the imaging instruction to the imaging possible device.

4. The imaging linking system according to claim 3, wherein the first processor is configured to end processing of the imaging linking system in a case where a time equal to or larger than a threshold value has elapsed from the reception of the imaging request.

5. The imaging linking system according to claim 3, wherein the first processor is configured to:

provide, to the imaging device that has sent the imaging request, an authority to browse a captured image transmitted to the first processor.

6. The imaging linking system according to claim 3, wherein the second processor is configured to:

receive the imaging instruction;

receive an image acquisition instruction from an imaging person in response to the imaging instruction or receive an image acquisition instruction that is output in response to the imaging instruction;

acquire a captured image of the target subject in response to the image acquisition instruction; and transmit the captured image to the first processor together with information related to the imaging request.

7. The imaging linking system according to claim 1, wherein the first processor is configured to:

specify the imaging device as the imaging possible device based on a distance between the position information of the target subject and position information of the imaging device.

8. The imaging linking system according to claim 1, wherein the imaging instruction is provided to all or a selection of a plurality of the second processors.

9. The imaging linking system according to claim 1, wherein the imaging instruction is configured of a first imaging instruction and a second imaging instruction, and the first processor is configured to:

transmit the second imaging instruction to the imaging possible device that has not received the first imaging instruction.

10. The imaging linking system according to claim 1, wherein the imaging device includes a rejection mode in which the imaging instruction is not received, and the first processor is configured to:

not transmit the imaging instruction to the imaging possible device that is set to the rejection mode.

11. The imaging linking system according to claim 1, wherein, in a case where the target subject is determined to be included in the angle of view, the imaging instruction is transmitted to the imaging possible device.

12. The imaging linking system according to claim 1, wherein the first processor is configured to include a memory that stores individual recognition information for specifying the target subject, and the first processor or the second processor is configured to perform a notification display of the target subject in a captured image based on the individual recognition information.

13. The imaging linking system according to claim 1, wherein the first processor is configured to:

receive an evaluation for a captured image transmitted to the first processor.

14. An imaging linking system in which an imaging device images a target subject that sends position information, the imaging linking system comprising:

a first processor located in a server device and configured to:

specify an imaging possible device capable of performing imaging; and transmit an imaging instruction for the target subject to the imaging possible device based on the position information of the target subject; and a second processor located in the imaging possible device and configured to:

receive the imaging instruction, wherein the first processor is configured to:

acquire information related to a moving distance of the target subject based on the position information of the target subject and transmit, to the imaging possible device to which the imaging instruction is transmitted, an imaging instruction cancellation notification for invalidating the imaging instruction, based on the information related to the moving distance, wherein the first processor located in the server device is configured to transmit the imaging instruction cancellation notification for invalidating the imaging instruction to the second processor located in the imaging possible device based on the information related to the moving distance.

15. An imaging linking system in which an imaging device images a target subject that sends position information, the imaging linking system comprising:

a first processor configured to:

specify an imaging possible device capable of performing imaging; and transmit an imaging instruction for the target subject to the imaging possible device based on the position information of the target subject; and a second processor configured to:

receive the imaging instruction, wherein the target subject is configured of a first target subject and a second target subject, the imaging instruction is configured of a first imaging instruction for the first target subject and a second imaging instruction for the second target subject, and the first processor is configured to:

acquire a distance between the first target subject and the second target subject based on the position information of the first target subject and the position information of the second target subject; and transmit the second imaging instruction to the imaging possible device that has received the first imaging instruction, based on information of the distance.

16. An imaging linking system in which an imaging device images a target subject that sends position information, the imaging linking system comprising:

a first processor configured to:

specify an imaging possible device capable of performing imaging; and transmit an imaging instruction for the target subject to the imaging possible device based on the position information of the target subject; and a second processor configured to:

receive the imaging instruction, wherein the imaging device transmits, to the first processor, operation information indicating that the imaging device is during imaging, and the first processor is configured to:

transmit, to the imaging possible device that is during the imaging, a non-explicit imaging instruction in which the imaging instruction is not notified to an imaging person and transmit, to the imaging possible device that is not during the imaging, an explicit imaging instruction in which the imaging instruction is notified to the imaging person.

17. A server device that configures an imaging linking system in which an imaging device images a target subject possessing a tracker in a linked manner, the server device comprising:

a first processor, wherein the first processor is configured to:

receive an imaging request for the target subject;

acquire position information of the target subject based on a sending signal of the tracker;

acquire position information and angle-of-view information of the imaging device;

specify an imaging possible device capable of imaging the target subject among the imaging devices based on the position information of the target subject and the position information of the imaging device;

transmit an imaging instruction for the target subject to the imaging possible device based on the position information of the target subject, determine whether or not the target subject is included in an angle of view based on the position information of the target subject and the angle-of-view information of the imaging possible device;

transmit, to the imaging possible device, a non-explicit imaging instruction in which the imaging instruction is not notified to an imaging person, in a case where it is determined that the target subject is included in the angle of view; and transmit, to the imaging possible device, an explicit imaging instruction in which the imaging instruction is notified to the imaging person, in a case where it is determined that the target subject is not included in the angle of view.

18. An imaging linking method in which an imaging device images a target subject sending position information, the imaging linking method comprising:

by a first processor, a step of specifying an imaging possible device capable of performing imaging;

a step of transmitting an imaging instruction for the target subject to the imaging possible device based on the position information of the target subject; and by a second processor, a step of receiving the imaging instruction, wherein the step of transmitting the imaging instruction by the first processor includes:

a step of receiving angle-of-view information from the imaging possible device;

a step of determining whether or not the target subject is included in an angle of view based on the position information of the target subject and the angle-of-view information of the imaging possible device; and a step of transmitting, to the imaging possible device, a non-explicit imaging instruction in which the imaging instruction is not notified to an imaging person in a case where it is determined that the target subject is included in the angle of view, and an explicit imaging instruction in which the imaging instruction is notified to the imaging person, in a case where it is determined that the target subject is not included in the angle of view.

19. A non-transitory, computer-readable tangible recording medium on which a program for causing the first and the second processor to execute the imaging linking method according to claim 18 is recorded.

* * * * *